United States Patent [19]

Ekstam

[11] B 3,995,350
[45] Dec. 7, 1976

[54] METHOD AND AN APPARATUS FOR CLEAVING SLAUGHTERED CARCASSES

[75] Inventor: Martin Rudolf Ekstam, Kristianstad, Sweden

[73] Assignee: AB Stathmos, Jonkoping, Sweden

[22] Filed: Oct. 31, 1974

[21] Appl. No.: 519,599

[44] Published under the second Trial Voluntary Protest Program on February 17, 1976 as document No. B 519,599.

[30] Foreign Application Priority Data

Dec. 8, 1973 Sweden ............................ 7315152

[52] U.S. Cl. .................................... 17/23; 17/52
[51] Int. Cl.² ........................................ A22B 5/20
[58] Field of Search ...................... 17/1, 23, 43, 52

[56] References Cited
UNITED STATES PATENTS

| | | |
|---|---|---|
| 3,074,102 | 1/1963 | Hotard ................................. 17/23 |
| 3,159,869 | 12/1964 | Vogt et al. .............................. 17/23 |
| 3,628,218 | 12/1971 | Simonsen et al. ...................... 17/23 |

Primary Examiner—Louis G. Mancene
Assistant Examiner—Robert F. Cutting

[57] ABSTRACT

The invention pertains to an improved method and apparatus for cleaving slaughtered carcasses. For being able to remove spine portions remaining in each carcass half after cleaving, it is suggested that the lower portion of each half is tipped inwardly while the upper portion of each half is moved outwardly. This implies that the spine portions in each carcass half will be pressed outwardly on the inside of the carcass half and made available to cutting means which will cut out the spine portions with a minimum of losses and without affecting adjacent muscles.

11 Claims, 17 Drawing Figures

METHOD AND AN APPARATUS FOR CLEAVING SLAUGHTERED CARCASSES

The invention also pertains to an improved cleaving apparatus where a unique guiding body is used for obtaining the separation of spine portions from a cleaved carcass. The guiding body is arranged for cooperation with saw means located immediately behind the guiding body and being adjustable in a vertical sense. Means are also provided for removing the teeth of the carcass head, if the head is left on the carcass.

Swedish Pat. No. 336,542 describes an apparatus for cleaving slaughtered carcasses of pigs while cutting out the spine or part thereof, so-called bacon cleaving, by means of a band saw, in which the two parts of the band saw blade running in opposite directions to one another are guided in order to pass a supporting surface for the back of the slaughtered carcass at a small distance from each other, thereupon diverging in a direction outwardly from the supporting surface, so that the two parts of the band saw will saw simultaneously, each on one side of the spine, viz. one part during an upward movement and the other part during a downward movement.

It was previously possible to saw out the whole spine in this way but in later years pig breeding has produced pigs of such a large muscle volume that the band saw operating with the two parts cannot be used in order to saw out the spine within the pelvis region since the thigh muscles will be damaged thereby.

The present invention aims in the first place at eliminating the said drawback in the known apparatus and is based on the knowledge that in order to achieve a good result of the cleaving it is not only important to be able to saw in the proper manner but above all to be able to guide the slaughtered carcass to the correct position for sawing. For this purpose a method has been invented for cleaving slaughtered carcasses in general and pigs in particular, having the characteristics set out in claim 1, as well as an apparatus suitable for putting this method into effect and being of the kind and having the characteristics set out in claim 2 and the claims referring thereto.

For the purposee of elucidating it the invention will be described in greater detail in the following with reference to the accompanying drawings showing an apparatus for cleaving slaughtered carcasses of pigs in accordance with the invention, which may be used either for merely dividing the slaughtered carcass with or without the head into two parts centrally through the spine, or in order first to saw the slaughtered carcass centrally through the spine and then move the two carcass halves apart so as to permit a precision controlled bacon cleaving operation using a band saw in the same manner as according to the Swedish Pat. No. 336,542, or using circular saws, while the slaughtered carcass is all the time being moved forward by means of a conveyor in one and the same direction and giving room for cleaving a subsequent slaughtered carcass immediately after the cleaving operation has been completed. The apparatus described by way of example also comprises means for removing front teeth and canine teeth from the head while the head remains on the slaughtered carcass, in order to permit central cleaving of slaughtered carcasses having heads without risking that the saw will be damaged or destroyed against the hard dental enamel. In the drawings.

Figure 1:
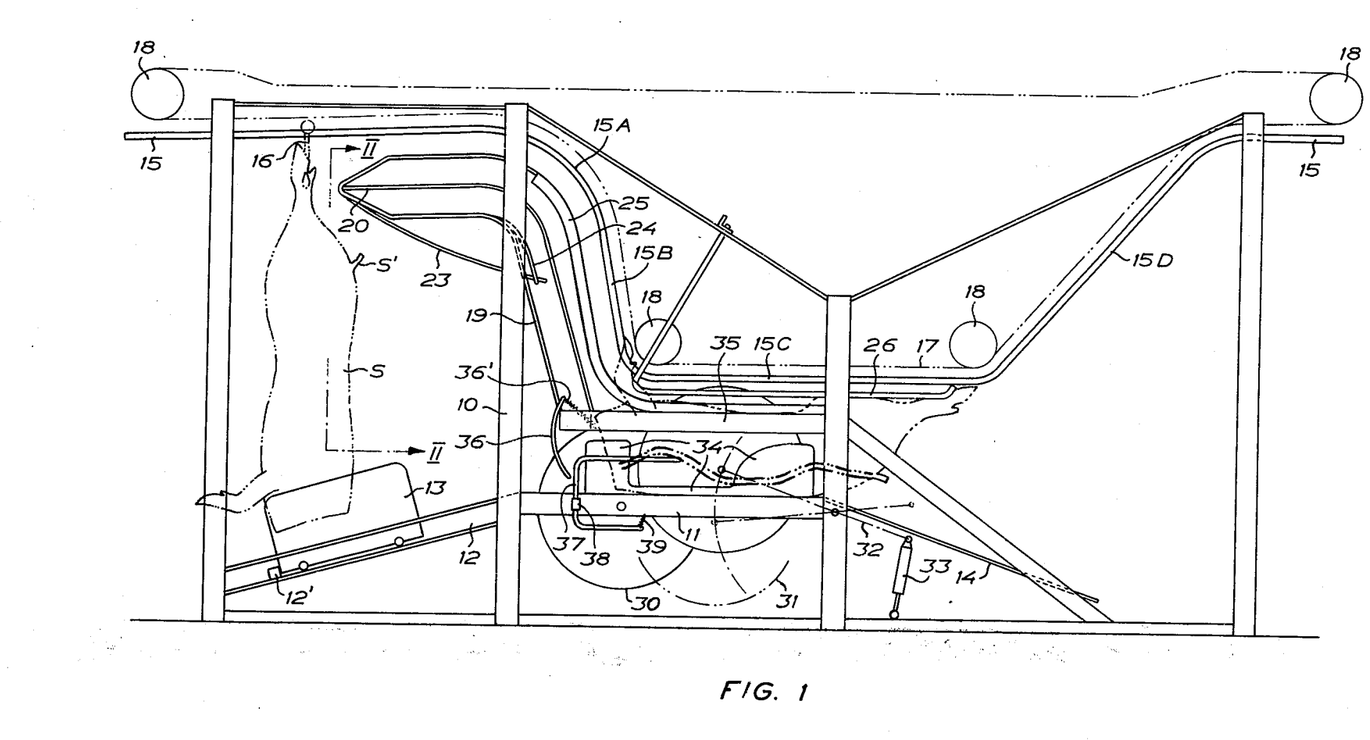
FIG. 1 is a side view of the apparatus according to the invention.

The apparatus shown in FIG. 1 comprises a beam frame 10 having an essentially horizontal table 11 with which there is connected an inclined entry portion 12 having rails and a bowl-shaped trolley 13 movable on said rails and an inclined exit portion 14 arranged as a sliding plane at the one and the other end of the table, respectively. A conventional suspension track 15 is connected with the frame, and the said suspension track forms a curved portion 15A inside the frame, said portion connecting the normally horizontal suspension track with a portion 15B inclined obliquely downwards and merging with a horizontal portion 15C disposed on a lower level than the rest of the suspension track, said portion 15C being connected through an inclined portion 15D with the rest of the suspension track, portions 15A, 15B and 15C extending across the table in the longitudinal direction thereof. In order to convey slaughtered carcasses on the suspension track there are provided suspension irons or gallows 16 of the known type in which the slaughtered carcasses are suspended from their hind legs, as shown in FIG. 1 where a slaughtered carcass is outlined in dot and dash lines S suspended from a suspension iron which is about to enter the apparatus. In order to propel the suspension irons through the apparatus along the recess formed by the suspension track in the apparatus there is provided in connection with the suspension track an endless conveyor 17 consisting of a chain or the like running over sheave pulleys some of which are outlined at 18 and provided with dogs for engaging with the suspension irons.

Figure 2:
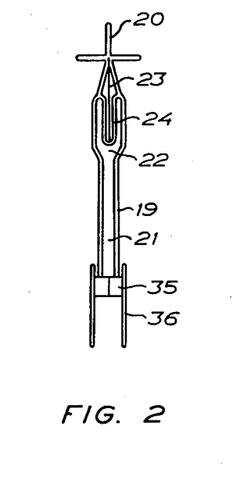
FIG. 2 is a partial end view on line II—II in FIG. 1 of a fender for guiding the slaughtered carcass while taking it down from a suspended position to a horizontal position.

In the same way as according to Swedish Pat. No. 336,542 the slaughtered carcasses arriving on the suspension track 15 suspended vertically from the track are to be tipped over when entering the apparatus in order to be placed on the table 11 lying on their back. In order to achieve this guiding of the slaughtered carcasses there is provided in the present case a cagelike fender 19 of a type similar to the one described in Swedish Pat. No. 336,542. The fender consequently consists of round bars and extends along portions 15A and 15B of the suspension track ending at the top in a point 20 extending along the horizontal entry portion of the suspension track 15 and directed towards the arriving slaughtered carcasses. The purpose is for the slaughtered carcasses to arrive on the suspension track with their back turned against the apparatus, whereupon the point 20 is to enter the slaughtered carcass between the hind legs of the carcass below the suspension iron in order to guide the suspension iron along the portions 15A and 15B of the suspension track. In the present case, however, the fender is modified in relation to the embodiment shown in the Swedish Pat. No. 336,542 in order to achieve a better and more reliable guiding of the carcass. Thus, the part of the fender which extends obliquely upwards to the point 20 — the said part will hereinafter be called the neck — is provided with a central guiding slot 21 disposed between the two round bars and having a width of about 30 mm and being provided with a hopper-like flaring portion 22 of a width amounting to about 100 mm, approximately where the neck merges into the horizontal portion of the fender, which thereupon terminates in the point 20. In the said guiding slot there is received the partly cut-off tail S' of the carcass so that the latter will be centered during its movement along the fender. In order that the tail may be moved into the flaring portion 22 and then continue into the guiding slot 21 there is mounted at the extreme end of the point 20 a spring rod 23 which is directed towards the rear along the point and the free end of which is received in a curved portion 24 formed by the round bars of the fender centrally in the flared portion 22 and behind said portion. The said spring rod guides the carcass as a result of its free end running in the space between thighs and consequently steers the tail into the flared portion 22 of the guiding slot 21.

In addition, the fender 19 is supplemented in the present case with guide means for the suspension iron, which consists of two tubular guiding rails 25 provided on the neck and spaced from one another in the transverse direction of the fender and being intended to engage with and support the suspension iron inside the hind legs of the carcass suspended therefrom in order to cooperate with the fender so as to achieve a suitable flaring of the triangle formed by the suspension iron and the hind legs and thighs of the carcass. The guiding rails may be adjustable laterally and vertically, and they extend through the apparatus along the horizontal portion 15C of the suspension track in order to support the suspension iron during its movement along the said portion. Along the horizontal portion 15C the guide rails 25 are besides supplemented with a pair of guide rails 26 lying above and being adjustable vertically and preventing the suspension iron from rising in this portion from the guide rails 25 so that the suspension iron will be guided in a horizontal plane throughout its horizontal movement along the table 11. Before the other elements of the apparatus for cleaving the carcass and guiding it during the cleaving operation are to be described, the operation of laying down the carcass will be briefly described. The carcass arrives at the apparatus on the suspension track 15 cut open and with the offal removed, and suspended from a suspension iron 17 with its hind legs and with the back turned against the apparatus and will now be placed on the table 11 where the cleaving operation proper is to be performed. The lower end of the carcass (with or without a head) comes into contact with the bowl-shaped trolley 13 which is located in a lower end position in contact with a support 12' on the rails 12, and while the carcass is pulled farther on along the suspension track towards the fender 19, the lower end of the carcass rests on the said trolley which will easily follow the movements of the carcass, rolling on the rails 12. In the path of motion of the carcass there may possibly be provided a fixed horizontal bar against which the lower portion of the carcass will come into contact before it hits the trolley 13 so as to occupy a slightly inclined position already at that time. The carcass is guided along the fender 19, which is received in the triangular opening formed by the suspension iron, the hind legs and the thighs, while the tail is received in the guide slot 21 at the same time as the suspension iron is guided by the rails 25. The trolley 13 permits the carcass to follow the take-down curve determined by the fender and the suspension track during the operation of taking down the carcass, due to the fact that the trolley 13 moves unobstructedly on the rails 12, and when the carcass has finally been placed with its back on the table 11, the trolley runs down to the abutment 12' in order to be ready to receive the next carcass. It will be noted that the operation of laying down the carcass does not differ basically from the principle applied according to the Swedish Pat. No. 336,542 but due to the improvements in the embodiment of the guiding means described here the laying down operation is carried out with greater precision.

Figure 3:
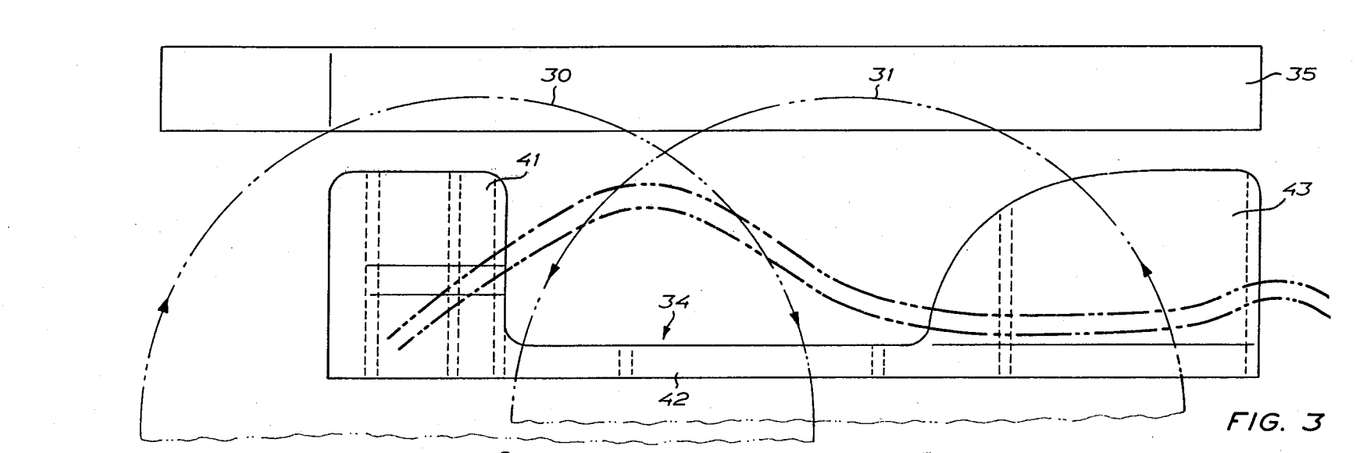
FIG. 3 is a side view on a larger scale of guiding bodies for the horizontal slaughtered carcass.
Figure 4:
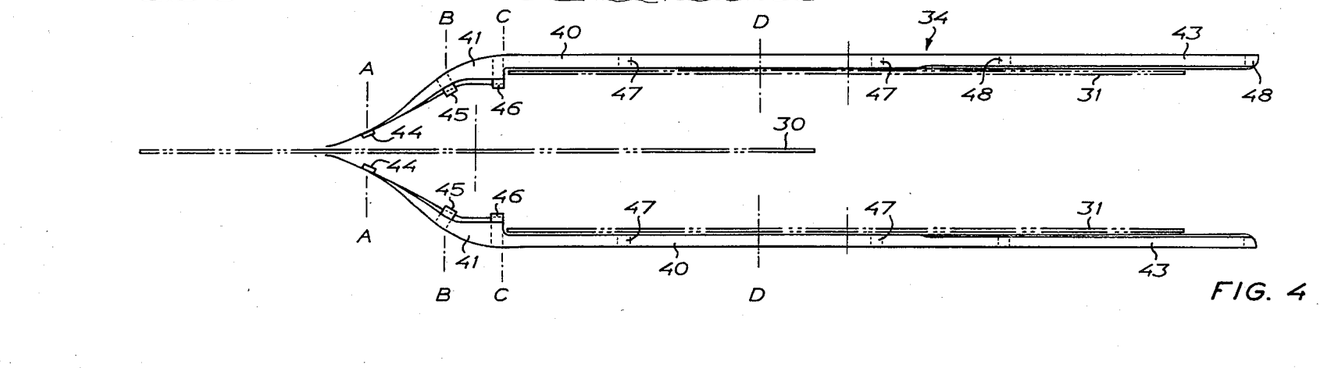
FIG. 4 is a plan view of the lower guiding body in FIG. 3.

In order to cleave the carcass centrally at the middle through the spine there is rotatably mounted a circular saw 30 on the table 11, said saw being connected to a suitable driving motor and projecting in the usual way up above the surface of the table with part of its periphery through a slit provided in the table. The said circular saw is meant to cleave the carcass centrally down the middle through the spine, said central cleaving operation being possibly the only cleaving operation or being possibly a preliminary operation before a subsequent bacon cleaving. For such a subsequent bacon cleaving operation there are provided two additional circular saws 31 which are carried by a cradle 32 swingably mounted in the frame and operable by means of a hydraulic or pneumatic cylinder 33 so that the circular saws may be swung between an inoperative position in which they are located entirely underneath the table 11, and one or more operable positions, in which they project with their periphery more or less up above the surface of the table through corresponding slots in the table. The two circular saws 31 are located on both sides of the circular saw 30 but after said saw, as seen in the direction of movement of the carcass, and partly overlap the circular saw, as shown by FIGS. 3 and 4.

A plough-like guiding body 34 extends on both sides of the circular saws on top of the table 11, and above the said guiding body there is provided a second plough-like guiding body 35 in connection with the fender 19 and extending in parallel with table 11 spaced above the table and the guiding body 34.

The guiding body 35 will be described first. It consists of two flat rails running in parallel and united in a plough-share at the left-hand end exactly where the neck of the fender 19 has its lower end. At the pointed end of the guiding body there are swingably mounted two downwardly directed legs 36 spaced from one another in the transverse direction and being retained in the position shown in FIG. 1 by means of springs 36' but being swingable towards the rear about a transverse axis against the action of the spring load. Due to their mobility backwards the legs 36 will run over the thighs and into the longitudinal cut made in the belly of the carcass. The said cut in the middle of the belly also passes through the middle of the breastbone and permits the offal to be removed.

When the carcass is pulled along the table 11, the legs 36 are instrumental in keeping its belly side with the belly cut in a central line and in guiding the guiding body 35 in the central cut through the breastbone, thus keeping the carcass in the correct position also from the belly side for cleaving it centrally through the spine by means of the circular saw 30. The guiding body 34 achieves that the two halves formed by the cleaving of the carcass are moved apart and, like the guiding body 35, it forms a plough-share at its left-hand end, the circular saw 30 passing unobstructedly through the said point, as shown in FIG. 4. The guiding body has a specific shape in order to guide the carcass in the right manner, especially during bacon cleaving, and this shape will be described in greater detail below. A pair of U-shaped yokes 37 are swingably mounted at their web on the table 11 at 38 in order to swing about vertical axes on either side of the guiding body 34, said yokes being spring loaded by means of springs 39 acting on one leg in order that the other leg, which is longer, may be pressed against the carcass on the outside thereof and kept in contact with the guiding body 34 during the first part of the movement by the carcass along the guiding body during the cleaving operation.

After the cleaving operation the carcass halves are pulled off the table 11 at the sliding plane 14 as a result of the continued motion by the suspension iron along the suspension track, and are raised to a suspended position when the suspension iron passes along the portion 15D of the suspension track in order then to continue along the suspension track suspended from the suspension iron.

The circular saw 30 is of sufficiently large diameter in order to be able to saw through the spine throughout its entire length. As shown by FIGS. 1 and 3, where the spine is shown in dot and dash lines, the spine is not entirely straight in shape but, as viewed when the carcass is lying on its back, it has a slightly upwardly curved portion in the pelvis region and a considerably more marked upwardly directed curved portion in the breast region. The circular saw 30 must of course be sufficently large to be able to saw through the spine everywhere, but since the sawing operation is done centrally through the spine there is no risk whatever that this sawing operation will lacerate the thigh muscles of the carcass, i.e. the hams of a pig. It is different, however, when the cleaving operation is to take place on both sides of the spine during a bacon cleaving operation. In order that this may not entail any cutting or laceration of the thigh muscles, the said cleaving operation takes place only after the preliminary sawing centrally through the spine by means of the circular saw 30, guiding the two carcass halves formed thereby in a specific manner and carefully adjusting the circular saws 31 used for the bacon cleaving operation in the vertical sense.

Figure 5:
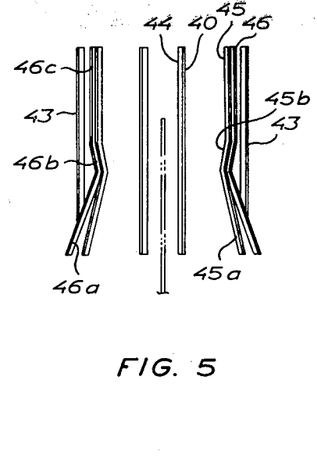
FIG. 5 is an end view of the lower guiding body in FIG. 3, as seen from the left.
Figure 6:
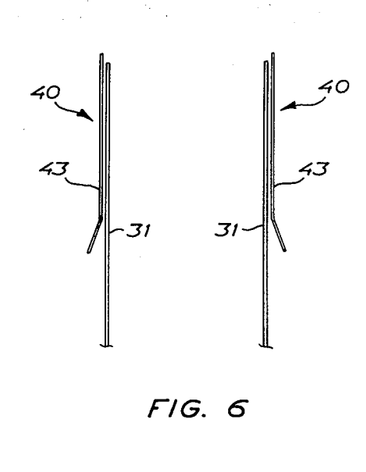
FIG. 6 is a corresponding end view, as seen from the right.

The guiding body 34 comprises two symmetrically disposed guide plates 40 carried by a number of uprights having different shapes according to their position on the guiding body and determining in their turn the shape of the guide plates attached thereto. At the front end each guide plate has a rectangular portion 41 projecting upwardly, said portion forming the ploughshare of the guide body, whereupon there follows, in the direction of movement of the carcass (from the left to the right), an elongated low portion 42 and finally, at the rear end, a portion 43 projecting upwardly and having approximately the shape of a circle sector at right angles. The most important part of the guiding body is the front part with the portions 41 the shape of which is determined by three uprights 44, 45 and 46. The uprights 44 at the extreme front end at the tip are straight and vertical, and they are located relatively close to each other, while the uprights 45 are located at a substantially greater distance and have at the bottom a portion 45a inclined obliquely inwardly and merging with a slightly outwardly-directed portion 45b into a straight vertical portion 45c at the extreme top, so that a channel is formed between the portions 45a and 45b. The uprights 46 are spaced slightly more from each other than the uprights 45 and have approximately the same shape as these, the lower portion designated 46a being however slightly more inclined than the portion 45a. This is clearly shown in FIG. 5. The straight portion 42 has uprights 47 of the same inclination as the portions 46a so that the portion 42 will form, at the bottom, a continuation of the rear margin of the portion 41 without changing the inclination of the guiding body. This inclination then continues along the lower part of the portion 43 as a result of the fact that the uprights 48 of the said portion have their lower portion inclined in the same way as the portion 46a, whereas the upper portion is straight and vertical so that the portion 43 of the plate has the shape shown in FIG. 6.

This specific shape of the guiding body 34 provides a unique guiding of a carcass which is highly advantageous for the bacon cleaving operation and which is based partly on the anatomical structure of the carcass and partly on the cleaving of the carcass by means of the circular saw 30 and taking place centrally through the spine as a sawing operation prior to the subsequent bacon cleaving operation. The guiding is shown in FIGS. 7A to 7D, which show a number of different cuts through the guiding body taken on lines A to D in FIG. 4. In the cut according to FIG. 7A the plates of the guiding body 34 has just begun to move apart the two halves of the carcass which are obtained as a result of the cleaving operation by means of the circular saw 30. In the position according to FIG. 7B the lower portion of the carcass lying on its back has been tipped inwardly as a result of the carcass being forced to adjust itself to the inclination of the plates 41 determined by the lower portion 45a of the uprights 45. This inward tipping has been accentuated additionally in FIG. 7C due to the more marked inclination of the plates 41 determined by the lower portion 46a of the uprights 46.

Figure 7:
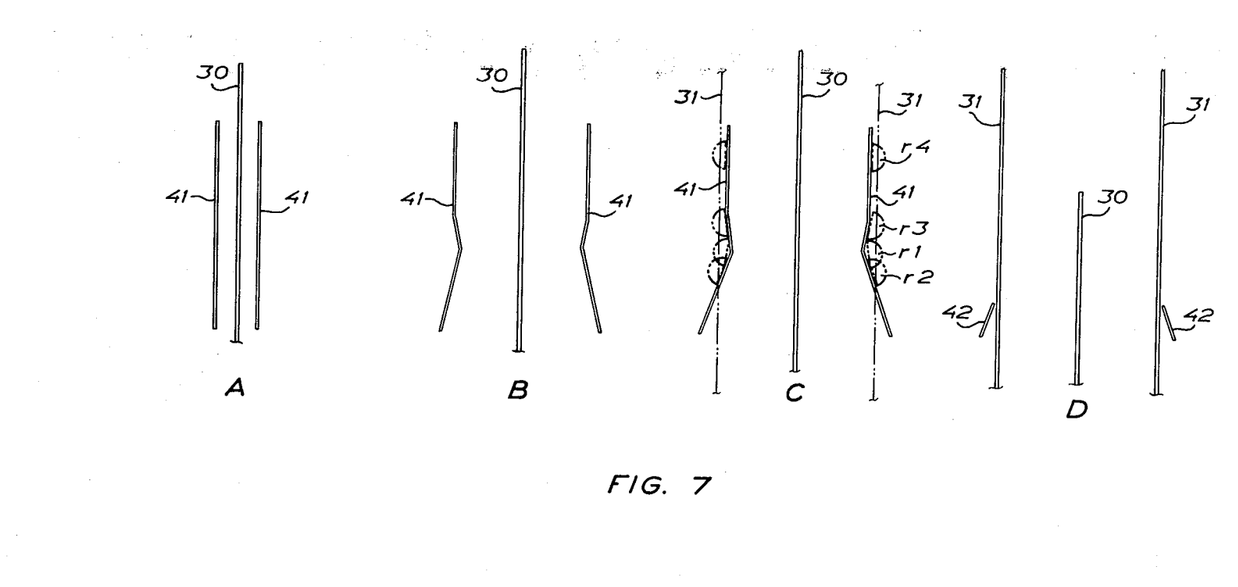
FIGS. 7A to 7D are diagrammatic sectional views of the lower guiding body in FIG. 3, in order to illustrate the guiding course during the cleaving operation.

What takes place during the bacon cleaving operation will now be studied in greater detail with the guidance of FIG. 7C. In this cut the two circular saws 31 are shown in dot and dash lines, as well as the parts of the spine in various stages of the passage of the carcass along the guiding body 34 in the area around the uprights 46. The spine, which has already been sawn centrally, occupies the position designated r1 when the curved portion of the pelvis region has passed the uprights 46 and will thereupon be located lower down in the position r2 in order then to rise to position r3 and finally reach a top position r 4, corresponding to the position of the spine in the breastbone region. Due to the guiding against the guiding body 34, the guiding being supported by the yokes 37, the spine is forced to project from the surrounding muscles when the pelvis region passes the circular saws 31. In that connection the spine is located in the channel formed by the guiding body so that the spine can be sawn off by means of the circular saws 31 with essentially the same thickness of the cut despite of the fact that the position of the spine will vary considerably in a vertical sense above the table, and without lacerating or cutting through the thigh muscles. The position of the spine in the carcass of a pig will vary between 20 and 240 mm. In the pelvis region where the hams of a horizontal pig carcass will lie at a height of 160 to 170 mm above the table 11 the two circular saws 31 will have to operate at a maximum height of about 150 mm, which is set by means of a cylinder 33, and will thus never reach the hams although they will reach sufficiently high to saw out the spine in positions r1, r2 and r3. When the pelvis region has passed the circular saws 31 these are raised to an upper position in which they will reach sufficiently high to be able to saw out the spine in the position r4. The essential advantage of this sawing operation is thus partly that the hams will not be damaged and partly that as small a portion of the muscles as possible will be sawn off when the spine passes in positions r1, r2 and r3, since the portions of each carcass half lying above and below are kept spaced from the saws by means of the guiding body 34. It will be noted that the circular saws 31 operate immediately behind the portion 41. After the sawing operation both halves of the carcass are kept away from these circular saws by means of the portion 42 of the guiding body, as shown by FIG. 7D, and thereupon by the portion 43.

All circular saws operate downwardly in the cutting portion. Conduits may be provided for permitting the sawing surfaces to be flushed with hot or cold water or with a disinfectant solution. The cylinder 33 may be controlled by means of pulses from contact means at the suspension track.

So far it has been assumed that the cleaving of the carcass takes place after the head has been removed. It is desirable, however, that cleaving of carcasses can take place also while the head remains on the carcass, and for this purpose the apparatus described must be combined with a device for removing front teeth and canine teeth, since it is not possible to saw through these without the saw blade being quickly destroyed by the hard dental enamel. Such a device may consist of a saw or a nipping device for horizontal cuts through the suspended carcass immediately behind the canine teeth, or else it may consist of a nipping device for vertical cuts through the carcass, for instance of the type shown in FIGS. 8 to 14. This device, which should consequently be disposed on the entry side of the cleaving apparatus described, will now be described in greater detail.

Figure 8:
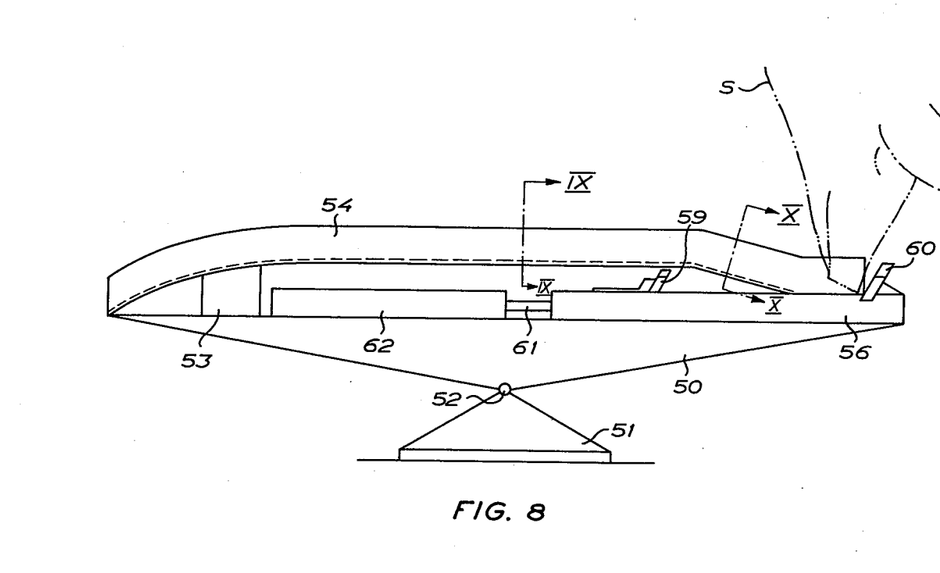
FIG. 8 is a side view of an apparatus for cutting off front teeth and canine teeth on a suspended slaughtered carcass when it is moved up to the cleaving apparatus.
Figure 9:
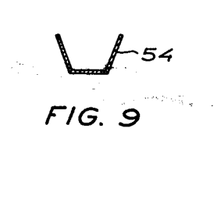
FIGS. 9 and 10 are sectional views on lines IX—IX and X—X, respectively, in FIG. 8.
Figure 10:
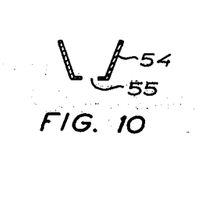
Figure 11:
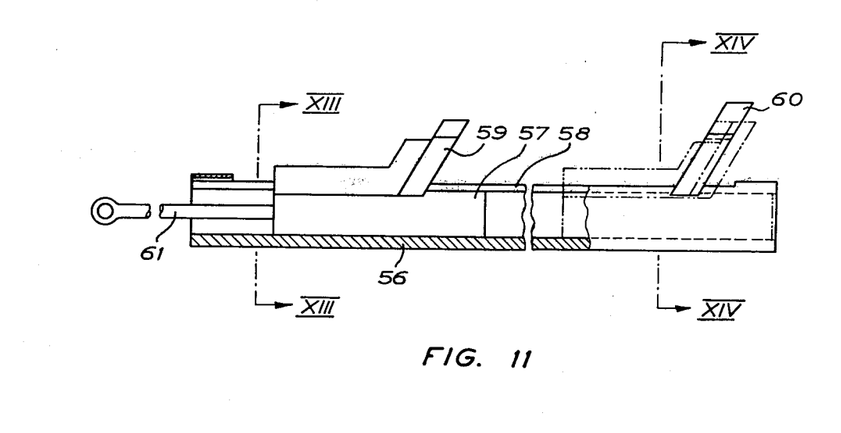
FIG. 11 is a side view, partly in axial section, of the operating portion in the apparatus according to FIG. 8 on a larger scale.
Figure 12:
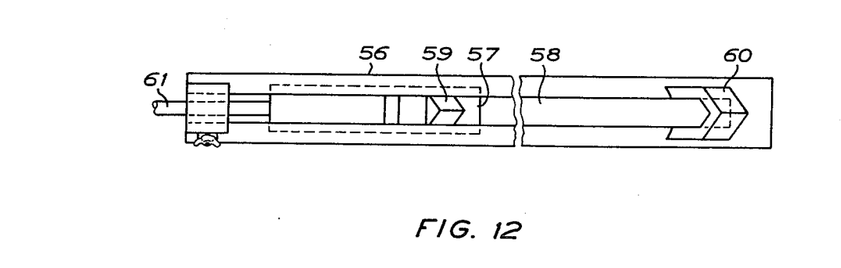
FIG. 12 is a plan view of the operating portion in FIG. 11.
Figure 13:
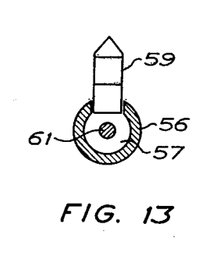
FIG. 13 is a sectional view on line XIII—XIII in FIG. 11.
Figure 14:
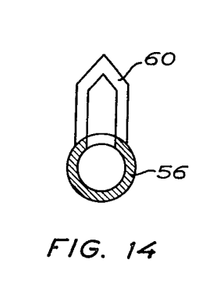
FIG. 14 is a sectional view on line XIV—XIV in FIG. 11.

The nipping means according to FIGS. 8 to 14 comprises a rocker 50 which is mounted on a foot 51 for a rocking motion about a horizontal axis extending transversely of the path of motion of the carcasses through the point 52, the rocker being loaded with a weight 53 in such a way that its front end in relation to the movement of the carcasses, i.e. the left-hand end in FIG. 8, is heavier than the other end, so that it will press down the rocker towards the left. On the rocker, which extends centrally through the path of motion of the carcasses, there is provided a channel 54 which according to FIG. 10 has a slot 55 in the bottom along the right-hand end portion. At this end of the rocker there is provided a tubular guide 56 in which there is displaceably guided a slide 57 having a movable cutting means 59 projecting obliquely upwardly from the guide through a slot 58. At the right-hand end of the guide 56 there is provided a stationary cutting member 60 having an opening which is carefully adjusted to the cutting member 59 as to its shape and size. The cutting member 59 is displaceable into and partly through the stationary cutting member 60, the outer margin of the cutting member 59 and the inner margin of the opening in the cutting member 60 forming the two cooperating edges on the cutting members. The slide 57 is connected to a piston 61 on a hydraulic or pneumatic cylinder 62 which is carried by the rocker in line with the guide 56.

When the suspended carcass S arrives at the cutting device the left-hand end of the rocker 50 is lowered due to the weight 53 and the carcass will slide with the nose into the channel 54. Accordingly as it moves along it, the channel, after the axis 52 has been passed, will swing downwardly towards the right, while being pressed all the time against the nose of the carcass which is in contact with the bottom of the channel 54. When the carcass is in the position shown in FIG. 8 with the nose resting in contact with the cutting member 60, its movement is stopped temporarily and the cylinder 62 is placed under pressure in order to displace the cutting member 59 quickly and powerfully from the position shown in continuous lines in FIGS. 8 and 11 to the position shown in dot and dash lines in FIG. 11, the cutting member 59 moving in the slot 58 in the guiding member 56 into the slot 55 in the channel 54 and, in cooperation with the cutting member 60, nipping off a portion of the nose of the carcass, viz. the portion holding the front teeth and the canine teeth. The nipping operation is done by shearing in the same way as in a punch. The movement of the carcass continues after the cutting operation in order to introduce the carcass into the cleaving apparatus, where the circular saw 30 can now be introduced into the notch or cut which has been made in the nose of the carcass in order to cleave the carcass centrally through the spine with the head remaining on the carcass, without the circular saw touching any dental enamel and being destroyed or damaged.

It will be evident that the invention provides a method and an apparatus for cleaving carcasses of slaughtered animals through which it is possible to cleave slaughtered carcasses with or without the head remaining on carcass, either centrally through the spine only or in addition on both sides of the spine (bacon cleaving), completely automatically without any other manual operation than supervising the function of the automatic apparatus.

What is claimed is:

1. An improved method of cleaving slaughtered carcasses, the cleaving operation taking place essentially centrally by sawing through the spine while pulling the carcass forward lying on the back, the improvement consisting in that the two halves of the carcass obtained from the cleaving operation are moved apart and guided in such a way that the lower portion of each half is tipped inwardly while its upper portion is moved outwardly in order that the spine portion remaining in each carcass half may be pressed outwardly on the inside of the carcass half and become accessible for cutting by means of a saw while removing the smallest possible quantity of adjacent muscles above and below the spine portion.

2. Improved apparatus for cleaving slaughtered carcasses comprising a table for carrying the carcass lying on its back, a circular saw projecting upwardly from the table and means for pulling the carcass on the table forward during the sawing operation; the improvement consisting in that there is a guiding body disposed symmetrically on both sides of the circular saw on the table for guiding the halves of the carcass obtained through the cleaving operation by means of said circular saw centrally through the spine, while moving said two halves apart; in that there being provided in the said guiding body on the outside thereof, between guiding surfaces disposed obliquely in relation to each other a channel for receiving the spine portion remaining in each carcass half over at least part of its length; and in that there are provided saw means immediately after the channel in the guiding body for cutting off the spine portion on each half of the carcass guided by means of said channel.

3. Apparatus as claimed in claim 2, wherein the said saw means consists of a pair of circular saws adjustable in the vertical sense.

4. Apparatus as claimed in claim 2, wherein there are spring loaded means for pressing the carcass halves against the guiding body on both sides of the guide body.

5. Apparatus as claimed in any one of claims 2, wherein there is provided above the guiding body a second upper guiding body which extends in front of the circular saw with a plough-like portion for engagement with the belly side of the carcass after it has been cut open and the offal removed, before and after the cleaving thereof essentially centrally through the spine and for guiding the carcass during its movement past the circular saw.

6. Apparatus as claimed in claim 5, wherein the upper guiding body has a pair of swingable legs in the area of its plough-share which may be introduced into the carcass and which are yielding against spring action in the intended direction of movement of the carcass.

7. Apparatus as claimed in claim 5 having a fender projecting above the table for guiding the carcass while tipping it from a suspended position to a horizontal position on the table, wherein there is provided a guiding slot in the said fender, said guiding slot being connected at its lower end with the plough-share of the upper guiding body and being arranged in such a way as to receive the tail of the carcass guidingly during the movement of the carcass along the fender.

8. Apparatus as claimed in claim 7, wherein the guiding slot has a flaring entry opening in its upper end.

9. Apparatus as claimed in claim 8, wherein there is provided on the fender a spring bar extending inwardly between the cut-apart thighs and guiding the tail of the carcass into the flared entry opening of the guiding slot.

10. Improved apparatus for cleaving slaughtered carcasses, comprising a table for carrying the carcass lying on its back, a circular saw projecting upwardly from the table and means for pulling the carcass on the table forward during the sawing operation; the improvement consisting in that there is a guiding body disposed symmetrically on both sides of the circular saw on the table for guiding the halves of the carcass obtained through the cleaving operation by means of said circular saw centrally through the spine, while moving said two halves apart; in that there being provided in the said guiding body on the outside thereof, between guiding surfaces disposed obliquely in relation to each other a channel for receiving the spine portion remaining in each carcass half over at least part of its length; and in that at the entry side of the apparatus there being provided means for removing front teeth and canine teeth of the head of the carcass.

11. Apparatus as claimed in claim 10, wherein said teeth removing means comprises a nipping means arranged on a rocker, said nipping means being activated when said rocker is rotated.

* * * * *